(12) United States Patent
Sekito et al.

(10) Patent No.: US 10,099,535 B2
(45) Date of Patent: Oct. 16, 2018

(54) VEHICLE AIR-CONDITIONING UNIT

(71) Applicant: DENSO CORPORATION, Kariya, Aichi-pref. (JP)

(72) Inventors: Yasuhiro Sekito, Kariya (JP); Syunsuke Ishiguro, Kariya (JP); Shinya Kato, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 74 days.

(21) Appl. No.: 15/128,606

(22) PCT Filed: Mar. 16, 2015

(86) PCT No.: PCT/JP2015/001445
§ 371 (c)(1),
(2) Date: Sep. 23, 2016

(87) PCT Pub. No.: WO2015/146060
PCT Pub. Date: Jan. 10, 2015

(65) Prior Publication Data
US 2017/0096050 A1    Apr. 6, 2017

(30) Foreign Application Priority Data

Mar. 26, 2014  (JP) ................................. 2014-064214

(51) Int. Cl.
*B60H 1/00* (2006.01)
*B60H 1/32* (2006.01)
*B60H 1/12* (2006.01)

(52) U.S. Cl.
CPC ....... *B60H 1/3233* (2013.01); *B60H 1/00064* (2013.01); *B60H 1/00678* (2013.01); *B60H 1/12* (2013.01); *B60H 2001/00135* (2013.01)

(58) Field of Classification Search
CPC .............. B60H 1/3233; B60H 1/00064; B60H 1/00678; B60H 1/12; B60H 2001/00135;
(Continued)

(56) References Cited

U.S. PATENT DOCUMENTS 4,340,112 A * 7/1982 Sutoh .................. B05B 17/0615
                                                      165/204
4,460,036 A * 7/1984 Yoshimi ............. B60H 1/00842
                                                      165/203

(Continued)

FOREIGN PATENT DOCUMENTS

EP          1457366 A1     9/2004
GB          2279143 A  * 12/1994  ........... B60H 1/3233
(Continued)

*Primary Examiner* — Justin Jonaitis
(74) *Attorney, Agent, or Firm* — Harness, Dickey & Pierce, P.L.C.

(57) ABSTRACT

An air conditioning case includes a first partition wall that receives a condensed water generated by an evaporator, and the first partition wall is disposed above an overlapped portion of a heater core and between the evaporator and the heater core. Therefore, the first partition wall can prevent the condensed water dropped from the evaporator from being applied directly to the heater core. As a result, in a structure in which at least a portion of the heater core overlaps with the evaporator from below, the condensed water of the evaporator is less likely to be applied to the heater core.

12 Claims, 4 Drawing Sheets

(58) Field of Classification Search
CPC ........ B60H 1/00742; B60H 2001/0015; B60H 1/00842; B60H 1/00; F28F 27/02; F28F 1/00; Y02T 10/121; Y02T 10/146; Y02T 10/16
USPC ..... 165/41, 287, 288, 294, 297, 42, 44, 203, 165/202, 204
See application file for complete search history.

(56) References Cited

U.S. PATENT DOCUMENTS

| | | | |
|---|---|---|---|
| 6,213,198 B1 | | 4/2001 | Shikata et al. |
| 6,431,267 B1 * | | 8/2002 | Tanaka ............... B60H 1/00064 165/204 |
| 7,029,391 B2 * | | 4/2006 | Nagaya .............. B60H 1/00028 165/203 |
| 2002/0139513 A1 * | | 10/2002 | Natsume ........... B60H 1/00064 165/42 |
| 2003/0168201 A1 * | | 9/2003 | Abouchaar ........ B60H 1/00064 165/42 |
| 2006/0021424 A1 * | | 2/2006 | Ishikawa ........... B60H 1/00064 73/114.01 |
| 2006/0042778 A1 * | | 3/2006 | Stevenson .......... B60H 1/00692 165/41 |
| 2008/0245501 A1 * | | 10/2008 | Kang .................. B60H 1/00007 165/42 |
| 2008/0295992 A1 * | | 12/2008 | Shindoh ............. B60H 1/00028 165/42 |
| 2009/0025904 A1 | | 1/2009 | Tokunaga et al. |
| 2009/0064694 A1 * | | 3/2009 | Stephenson ........ B60H 1/00035 62/186 |
| 2011/0005718 A1 * | | 1/2011 | Seto ................... B60H 1/00064 165/61 |
| 2011/0009043 A1 * | | 1/2011 | Nanaumi ........... B60H 1/00564 454/121 |
| 2015/0122473 A1 * | | 5/2015 | Nii ...................... B60H 1/0005 165/202 |

FOREIGN PATENT DOCUMENTS

| | | |
|---|---|---|
| GB | 2279143 A | 12/1994 |
| JP | S60183218 A | 9/1985 |
| JP | H07005824 U | 1/1995 |
| JP | H09254630 A | 9/1997 |
| JP | H10058939 A | 3/1998 |
| JP | 2004276707 A | 10/2004 |
| JP | 2009023592 A | 2/2009 |
| JP | 2011126401 A | 6/2011 |
| WO | WO-2015146058 A1 | 10/2015 |
| WO | WO-2015146059 A1 | 10/2015 |

* cited by examiner

VEHICLE AIR-CONDITIONING UNIT

CROSS-REFERENCE TO RELATED APPLICATIONS

This application is a U.S. National Phase Application under 35 U.S.C. 371 of International Application No. PCT/JP2015/001445 filed on Mar. 16, 2015 and published in Japanese as WO 2015/146060 A1 on Oct. 1, 2015. This application is based on and claims the benefit of priority from Japanese patent application No. 2014-064214 filed on Mar. 26, 2014. The entire disclosures of all of the above applications are incorporated herein by reference.

TECHNICAL FIELD

The present disclosure relates to a vehicle air conditioning unit for blowing an air conditioning wind into a vehicle interior.

BACKGROUND ART

Up to now, a variety of vehicle air conditioning units that blow an air conditioning wind have been known. For example, one of the vehicle air conditioning units is disclosed in Patent Literature 1. The vehicle air conditioning unit of Patent Literature 1 includes an evaporator functioning as a cooler that cools an air flowing into an air conditioning case, and a heater core functioning as a heater that heats the air flowing out of the evaporator. An air flows substantially in a horizontal direction of a vehicle in the air conditioning case of the vehicle air conditioning unit. In order to decrease a width of the vehicle air conditioning unit in a vertical direction of the vehicle, the vehicle air conditioning unit of Patent Literature 1 is structured such that the evaporator and the heater core are inclined with respect to an air flow direction in the air conditioning case.

In the vehicle air conditioning unit of Patent Literature 1, taking a drainage of a condensed water from the evaporator into consideration, the heater core is disposed downstream of the evaporator in the air flow direction so as not to overlap with the evaporator below the evaporator.

PRIOR ART LITERATURE

Patent Literature

Patent Literature 1: JP 2004-276707 A

SUMMARY OF INVENTION

According to the studies by the present inventors, in the vehicle air conditioning unit of Patent Literature 1, since the heater core is disposed so as not to overlap with the evaporator below the evaporator, a physical size of the vehicle air conditioning unit is larger in the air flow direction. Under the circumstances, in order to downsize the vehicle air conditioning unit, the present inventors have considered that the heater core is disposed so that a part of the heater core overlaps with the evaporator below the evaporator.

However, when the heater core is disposed below the evaporator as described above, there is a risk that the condensed water in the evaporator is applied to the heater core. For example, when the condensed water is applied to the heater core, since the condensed water is re-evaporated by a heat of the heater core, there is a risk that a dehumidification capacity of the vehicle air conditioning unit is reduced. In addition, since the condensed water is rapidly re-evaporated in the heater core, there is a risk that an abnormal noise caused by the re-evaporation may occur.

In view of the above difficulties, it is an object of the present disclosure to provide a vehicle air conditioning unit capable of making it difficult to apply a condensed water of a cooler to a heater in a structure where at least a portion of the heater is disposed to overlap with the cooler from below.

According to one aspect of the present disclosure, a vehicle air conditioning unit comprises an air conditioning case that circulates an air into a vehicle interior, a cooler disposed in the air conditioning case, the cooler cooling the air flowing in the air conditioning case, and a heater disposed in the air conditioning case, the heater heating the air flowing out of the cooler, wherein the heater includes an overlapped portion disposed to overlap with the cooler from below in a vertical direction of the vehicle, the overlapped portion being at least a portion of the heater, and the air conditioning case includes a first case wall that receives a condensed water generated by the cooler, the first case wall being disposed above the overlapped portion of the heater and being disposed between the heater and the cooler.

Since the air conditioning case has the first case wall that receives the condensed water generated by the cooler, and the first case wall is disposed above an overlapped portion of the heater and between the heater and the cooler, the condensed water of the cooler is less likely to be applied to the heater with the aid of the first case wall.

DESCRIPTION OF EMBODIMENTS

Embodiments of the present disclosure will be described below with reference to the drawings. In the following respective embodiments, parts identical with or equivalent to each other are denoted by the same symbols in the drawings.

First Embodiment

Figure 1:
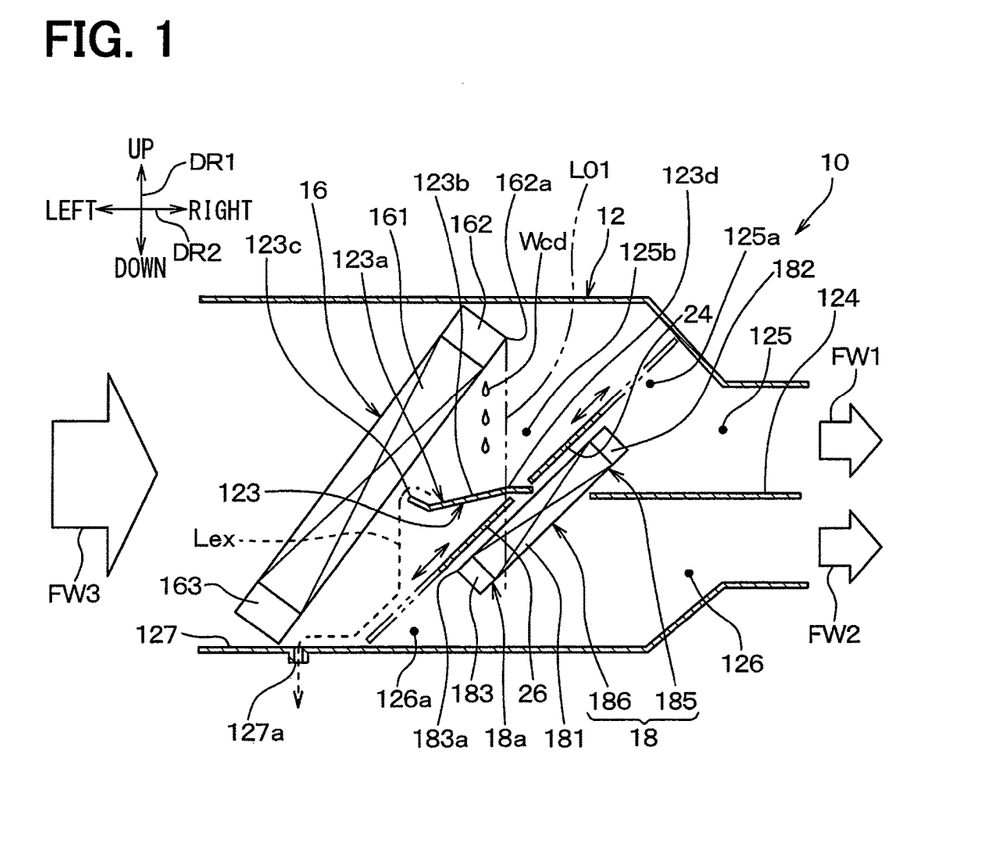
FIG. 1 is a cross-sectional view illustrating a main configuration of a vehicle air conditioning unit when the vehicle air conditioning unit is viewed from a vehicle longitudinal direction according to a first embodiment.

FIG. 1 is a cross-sectional view illustrating a main configuration of a vehicle air conditioning unit 10 when the vehicle air conditioning unit 10 is viewed from a vehicle longitudinal direction according to the present embodiment. In FIG. 1, upper, lower, right, and left arrows DR1 and DR2 indicate orientations in a vehicle mounted state in which the vehicle air conditioning unit 10 is mounted on a vehicle. In other words, double arrows DR1 in FIG. 1 indicate the vehicle vertical direction DR1, and double arrows DR2 indicate the vehicle width direction DR2. The vehicle vertical direction DR1, the vehicle width direction DR2, and the vehicle longitudinal direction are orthogonal to each other. In the vehicle of the present embodiment, a vehicle right side is provided with a driver's seat, and a vehicle left side is provided with a passenger's seat.

The vehicle air conditioning unit 10 in FIG. 1 configures a part of the vehicle air conditioning apparatus including a compressor and a capacitor provided in an engine room of the vehicle. The vehicle air conditioning unit 10 is disposed inside of a dashboard panel, that is, an instrument panel in a foremost portion of a vehicle interior.

As illustrated in FIG. 1, the vehicle air conditioning unit 10 includes an air conditioning case 12, an evaporator 16, a heater core 18, a first air mixing door 24, a second air mixing door 26, and a blower, not illustrated. The vehicle air conditioning unit 10 according to the present embodiment is configured by, for example, a suction type layout in which the blower is disposed in the air flow downstream side with respect to the evaporator 16.

The air conditioning case 12 is formed of a resin member forming an outer shell of the vehicle air conditioning unit 10, and has a substantially cuboid outline extending in the vehicle width direction DR2. FIG. 1 illustrates a main portion of the overall air conditioning case 12.

The air conditioning case 12 provides an air passage that allows an air to flow into the vehicle interior. The air passage includes a first airflow passage 125 and a second airflow passage 126, described later. An outside air that is an air of a vehicle exterior or an inside air that is an air in the vehicle interior is introduced into the air conditioning case 12 by the blower as indicated by an arrow FW3. At the same time, air flows are generated in the air conditioning case 12 as indicated by arrows FW1 and FW2. In other words, the air flow directions FW1 and FW2 in the air conditioning case 12 are in parallel to the vehicle width direction DR2 orthogonal to the vehicle vertical direction DR1, in short, in parallel to the horizontal direction of the vehicle.

In the air conditioning case 12, the outside air or the inside air introduced as indicated by an arrow FW3 flows into the evaporator 16. In other words, an outside air inlet port, not illustrated, for introducing the outside air into the air conditioning case 12, and an inside air inlet port, not illustrated, for introducing the inside air into the air conditioning case 12 are provided in the air conditioning case 12. Both of the outside air inlet port and the inside air inlet port are disposed in the air flow upstream side with respect to the evaporator 16.

The evaporator 16 is a cooling heat exchanger, that is, a cooler for cooling the air flowing in the air conditioning case 12. The evaporator 16 is housed in the air conditioning case 12, and the outside air or the inside air introduced into the air conditioning case 12 flows into the evaporator 16. The evaporator 16 configures a known refrigeration cycle device for circulating a refrigerant, together with a compressor, a capacitor, and an expansion valve, not illustrated. The evaporator 16 cools the air passing through the evaporator 16 by the aid of evaporation of the refrigerant.

A structure of the evaporator 16 is identical with that of known evaporators generally used in the vehicle air conditioning apparatus. Specifically, the evaporator 16 includes a core portion 161, and a first header tank unit 162 and a second header tank unit 163 which are provided on both ends of the core portion 161. The core portion 161 of the evaporator 16 includes multiple refrigerant tubes that communicate with the respective header tank units 162 and 163 and each have a flattened cross-sectional shape, and multiple corrugated fins that are provided between the respective refrigerant tubes, and formed into waves. The core portion 161 is structured such that the refrigerant tubes and the corrugated fins are alternately stacked on each other in the vehicle longitudinal direction.

In the evaporator 16, a heat exchange is performed between the low-temperature refrigerant flowing in the refrigerant tubes and air passing through the core portion 161, to thereby cool the air. Since the core portion 161 is partitioned into multiple fine air passages by the refrigerant tubes and the corrugated fins, the air exclusively flows in the core portion 161 in a thickness direction of the core portion 161.

The evaporator 16 is disposed such that the evaporator 16 is inclined with respect to the vehicle vertical direction DR1, and inclined with respect to the vehicle width direction DR2 in the air conditioning case 12. In detail, the evaporator 16 is disposed to be inclined so that the first header tank unit 162 and the second header tank unit 163 do not overlap with each other in the vehicle vertical direction DR1, and do not overlap with each other in the vehicle width direction DR2.

Specifically, the first header tank unit 162 forms an upper end of the evaporator 16, and the second header tank unit 163 forms a lower end of the evaporator 16. The evaporator 16 is disposed to be inclined with respect to the vehicle vertical direction DR1 so that the first header tank unit 162 is shifted downstream in the air flow directions FW1 and FW2 in the air conditioning case 12 as compared to the second header tank unit 163.

The heater core 18 is a heating heat exchanger, that is, a heater which heats the air flowing out of the evaporator 16 by the aid of an engine coolant that is a hot water. The heater core 18 is disposed downstream of the evaporator 16 in the air flow in the air conditioning case 12.

A structure of the heater core 18 is identical with that of known heating heat exchangers generally used in the vehicle air conditioning apparatus. Specifically, the heater core 18 includes a core portion 181, and a first header tank unit 182 and a second header tank unit 183 which are provided on both ends of the core portion 181. The core portion 181 of the heater core 18 includes multiple hot water tubes that communicate with the respective header tank units 182 and 183 and each have a flattened cross-sectional shape, and multiple corrugated fins that are provided between the respective hot water tubes, and formed into waves. The core portion 181 is structured such that the hot water tubes and the corrugated fins are alternately stacked on each other in the vehicle longitudinal direction.

In the heater core 18, a heat exchange is performed between the high-temperature engine coolant flowing in the hot water tubes and air passing through the core portion 181, to thereby heat the air. Since the core portion 181 is partitioned into multiple fine air passages by the hot water tubes and the corrugated fins, the air exclusively flows in the core portion 181 in a thickness direction of the core portion 181. Also, the heater core 18 is installed such that the first header tank unit 182 is located above the second header tank unit 183. Therefore, the first header tank unit 182 forms an upper end of the heater core 18, and the second header tank unit 183 forms a lower end of the heater core 18.

The heater core 18 is disposed at a distance from the evaporator 16, inclined in the same direction as that of the evaporator 16 with respect to the vehicle vertical direction DR1, and inclined in the same direction as that of the evaporator 16 with respect to the vehicle width direction DR2. In detail, the heater core 18 is disposed such that the heater core 18 is inclined so that the first header tank unit 182 and the second header tank unit 183 do not overlap with each other in the vehicle vertical direction DR1, and do not overlap with each other in the vehicle width direction DR2.

The heater core 18 is disposed such that at least a portion of the heater core 18 overlaps with the evaporator 16 in the vehicle vertical direction DR1. In other words, the heater core 18 includes an overlapped portion 18a disposed to overlap with the evaporator 16 from below in the vehicle vertical direction DR1 as at least a portion of the heater core 18. The overlapped portion 18a illustrated in FIG. 1 occupies a left area of the heater core 18 with respect to a vertical line L01. The vertical line L01 is defined by a virtual line that passes through a most downstream end 162a located on a most downstream side in the air flow directions FW1 and FW2 in the first header tank unit 162 of the evaporator 16, and extends in the vehicle vertical direction DR1.

The heater core 18 is disposed such that at least a portion of the heater core 18 overlaps with the evaporator 16 in the vehicle width direction DR2 in addition to the vehicle vertical direction DR1. Referring to FIG. 1, in more detail, the overlapped portion 18a that is a part of the heater core 18 overlaps with the evaporator 16 in the vehicle vertical direction DR1, and all of the heater core 18 overlaps with the evaporator 16 in the vehicle width direction DR2.

The overlapped placement of the evaporator 16 and the heater core 18 is determined with the inclusion of the header tank units 162, 163, 182, and 183 of the evaporator 16 and the heater core 18 as is apparent from FIG. 1, that is, is determined by comparison of the overall evaporator 16 with the overall heater core 18.

The air conditioning case 12 includes a first partition wall 123 as a first case wall and a second partition wall 124 as a second case wall. The first partition wall 123 and the second partition wall 124 function as a partition plate that divides a space in the air conditioning case 12 into two spaces in the vehicle vertical direction DR1. The first partition wall 123 and the second partition wall 124 are disposed to be continuous to each other across the heater core 18 in the vehicle width direction DR2, and installed downstream of the evaporator 16 in the air flow directions FW1 and FW2. In detail, the first partition wall 123 is placed between the evaporator 16 and the heater core 18, and partitions the inside of the air conditioning case 12 between the evaporator 16 and the heater core 18. The second partition wall 124 is disposed downstream of the heater core 18 in the air flow directions FW1 and FW2, and partitions the inside of the air conditioning case 12 downstream of the heater core 18.

For that reason, the first partition wall 123 and the second partition wall 124 divide the inside of the air conditioning case 12 vertically in the air flow downstream side of the evaporator 16, to thereby define a first airflow passage 125 in which the air flows as indicated by the arrow FW1, and a second airflow passage 126 in which the air flows as indicated by the arrow FW2. The second airflow passage 126 is disposed below the first airflow passage 125 across the first partition wall 123 and the second partition wall 124 in the vehicle vertical direction DR1.

The heater core 18 is disposed across the first airflow passage 125 and the second airflow passage 126. For that reason, the heater core 18 includes a first heating portion 185 disposed in the first airflow passage 125, and a second heating portion 186 disposed in the second airflow passage 126 in the heater core 18. The second heating portion 186 includes the overlapped portion 18a described above as understood from FIG. 1.

The first airflow passage 125 and the second airflow passage 126 include bypass passages 125a and 126a outside of the heater core 18 in the air conditioning case 12, respectively. In the bypass passages 125a and 126a, the air flows in parallel to the air flow passing through the heater core 18.

In detail, the bypass passage 125a provided in the first airflow passage 125, that is, the first bypass passage 125a allows the air that has passed through the evaporator 16 to bypass the first heating portion 185 of the heater core 18, and to flow to the air flow downstream side than the heater core 18. The bypass passage 126a provided in the second airflow passage 126, that is, the second bypass passage 126a allows the air that has passed through the evaporator 16 to bypass the second heating portion 186 of the heater core 18, and to flow to the air flow downstream side than the heater core 18. The first bypass passage 125a is disposed above the first heating portion 185, and a second bypass passage 126a is disposed below the second heating portion 186.

The first heating portion 185 of the heater core 18 includes the first header tank unit 182 and a portion of the core portion 181 which is disposed in the first airflow passage 125. The second heating portion 186 of the heater core 18 includes the second header tank unit 183 and a portion of the core portion 181 which is disposed in the second airflow passage 126.

The heater core 18 is disposed in parallel to the evaporator 16. The "parallel" is not intended to be construed in a mathematically strict meaning, but means "roughly parallel". In other words, the heater core 18 is juxtaposed with the evaporator 16 such that a space 125b for the air that has passed through the evaporator 16 to flow into the first bypass passage 125a is defined between the heater core 18 and the evaporator 16.

The first partition wall 123 is disposed such that at least a portion of the first partition wall 123 is interposed between a most downstream end 162a of the evaporator 16 and a most upstream end 183a in the horizontal direction of the vehicle, that is, in the vehicle width direction DR2 in FIG. 1. The most upstream end 183a is located on a most upstream side of the second header tank unit 183 of the heater core 18 in the air flow directions FW1 and FW2. The first partition wall 123 is disposed above the overlapped portion 18a of the heater core 18. For that reason, the first partition wall 123 can receive a condensed water Wcd on an upper wall surface 123a provided on an upper side of the first partition wall 123 when the condensed water Wcd generated in the evaporator 16 drops.

The upper wall surface 123a of the first partition wall 123 includes an up-down component 123b, and the up-down component 123b is configured such that a downstream side of the up-down component 123b is located higher than an upstream side of the up-down component 123b in the air flow directions FW1 and FW2. The up-down component 123b is a slope part having a slope so as to be positioned upward toward the downstream side in the air flow directions FW1 and FW2, in particular, as illustrated in FIG. 1.

Further, the upper wall surface 123a includes an upstream end 123c that is coupled with an upstream side of the up-down component 123b in the air flow directions FW1 and FW2, and the upstream end 123c is located on a position lower than a portion 123d located uppermost in the up-down component 123b. The upstream end 123c of the upper wall surface 123a is disposed upstream of the most upstream end 183a of the heater core 18 in the air flow directions FW1 and FW2. In short, the upstream end 123c is disposed at a position offset from the heater core 18 in the horizontal direction of the vehicle. As understood from FIG. 1, the portion 123d located uppermost in the up-down component 123b forms a downstream end of the up-down component 123b in the air flow directions FW1 and FW2.

In the air flow directions FW1 and FW2, the downstream end (portion 123d) of the up-down component 123b is located downstream of the most downstream end 162a of the evaporator 16. In other words, the downstream end (portion 123d) of the up-down component 123b is located on the right side of the vertical line L01 in FIG. 1. This configuration is to prevent the condensed water Wcd that has dropped on the upper wall surface 123a from flowing into the heater core 18.

Since the first partition wall 123 is configured as described above, the condensed water Wcd that has dropped from the evaporator 16 above the heater core 18 drops on the upper wall surface 123a of the first partition wall 123. For that reason, the condensed water Wcd is prevented from being applied to the heater core 18. When the condensed water Wcd pools on the upper wall surface 123a of the first partition wall 123 and overflows therefrom, the condensed water Wcd flows onto a bottom surface 127 of the air conditioning case 12 with the avoidance of the heater core 18 as indicated by a broken line Lex, and drained to the vehicle exterior from a drain hole 127a provided in the bottom surface 127.

The first air mixing door 24 is disposed between the evaporator 16 and the first heating portion 185 of the heater core 18 within the first airflow passage 125. The first air mixing door 24 has the slide door mechanism, and is slid by an electric actuator, not illustrated.

The first air mixing door 24 adjusts a flow proportion of the volume of air passing through the first heating portion 185 and the volume of air passing through the first bypass passage 125a according to a slide position of the first air mixing door 24. In detail, the first air mixing door 24 is moved from a max cool position where an air flow to the first heating portion 185 is blocked, and the total amount of air flows into the first bypass passage 125a to a max hot position where an air flow to the first bypass passage 125a is blocked, and the total amount of air flows into the first heating portion 185. In FIG. 1, the first air mixing door 24 at the max cool position is indicated by a solid line while the first air mixing door 24 at the max hot position is indicated by a two-dot chain line.

In the first airflow passage 125, the hot air that has passed through the first heating portion 185 of the heater core 18 and the cold air that has passed through the first bypass passage 125a are mixed together downstream of the heater core 18, and blown into the vehicle interior. Therefore, the air flowing in the first airflow passage 125 is adjusted in temperature according to the slide position of the first air mixing door 24, and blown into the vehicle interior.

The second air mixing door 26 is disposed between the evaporator 16 and the second heating portion 186 of the heater core 18 within the second airflow passage 126. The second air mixing door 26 has the same slide door mechanism as that of the first air mixing door 24, and is slid by an electric actuator, not illustrated.

The second air mixing door 26 adjusts a flow proportion of the volume of air passing through the second heating portion 186 and the volume of air passing through the second bypass passage 126a according to a slide position of the second air mixing door 26. Specifically, the second air mixing door 26 is moved from a max cool position where an air flow to the second heating portion 186 is blocked, and the total amount of air flows into the second bypass passage 126a to a max hot position where an air flow to the second bypass passage 126a is blocked, and the total amount of air flows into the second heating portion 186. In FIG. 1, the second air mixing door 26 at the max cool position is indicated by a solid line while the second air mixing door 26 at the max hot position is indicated by a two-dot chain line.

In the second airflow passage 126, the hot air that has passed through the second heating portion 186 of the heater core 18 and the cold air that has passed through the second bypass passage 126a are mixed together downstream of the heater core 18, and blown into the vehicle interior. Therefore, the air flowing in the second airflow passage 126 is adjusted in temperature according to the slide position of the second air mixing door 26, and blown into the vehicle interior.

Multiple air blowing ports, not illustrated, which blow the air conditioning wind adjusted in temperature by the first airflow passage 125 or the second airflow passage 126 are provided in the air conditioning case 12. The air conditioning wind of the first airflow passage 125 and the air conditioning wind of the second airflow passage 126 are blown into the vehicle interior through any one of the multiple air blowing ports. The multiple air blowing ports include, for example, a face blowing port for blowing the air conditioning wind toward an upper body of an occupant in the vehicle interior, a foot blowing port for blowing the air conditioning wind toward occupant's feet, and a defroster blowing port for blowing the air conditioning wind toward an inner surface of a vehicle windshield.

Further, in the vehicle air conditioning unit 10, the inside air and the outside air are introduced into the air conditioning case 12 so that the outside air is allowed to exclusively flow into the first airflow passage 125 while the inside air is allowed to exclusively flow into the second airflow passage 126. With the above configuration, an inside/outside air two-layer mode in which the outside air is blown upward in the vehicle interior, and the inside air is blown downward in the vehicle interior can be realized. In the inside/outside air two-layer mode, for example, the first airflow passage 125 is communicated with the face blowing port and the defroster blowing port, and the second airflow passage 126 is communicated with the foot blowing port.

As described above, according to the present embodiment, the air conditioning case 12 includes the first partition wall 123 that receives the condensed water Wcd generated by the evaporator 16. The first partition wall 123 is disposed above the overlapped portion 18a of the heater core 18 and between the evaporator 16 and the heater core 18. Therefore, the first partition wall 123 can prevent the condensed water Wcd dropped from the evaporator 16 from being applied directly to the heater core 18.

In addition, according to the present embodiment, the air flow directions FW1 and FW2 in the air conditioning case 12 are in parallel to the horizontal direction, and the evaporator 16 is disposed to be inclined with respect to the air flow directions FW1 and FW2. The heater core 18 is also disposed to be inclined in the same direction as that of the evaporator 16. As compared with a configuration in which the evaporator 16 and the heater core 18 stand upright in the vehicle vertical direction DR1, the vehicle air conditioning unit 10 can be downsized in the vehicle vertical direction DR1.

The overlapped portion 18a that is a part of the heater core 18 is disposed to overlap with the evaporator 16 from below in the vehicle vertical direction DR1. Therefore, as compared with a configuration in which the heater core 18 does not overlap with the evaporator 16 in the vehicle vertical direction DR1 at all, the vehicle air conditioning unit 10 can be downsized in the air flow directions FW1 and FW2.

According to the present embodiment, the upper wall surface 123a of the first partition wall 123 includes the up-down component 123b, and the up-down component 123b is configured such that a downstream side of the upper wall surface 123a is located above an upstream side of the upper wall surface 123a in the air flow directions FW1 and FW2. Therefore, the condensed water Wcd that has dropped on the upper wall surface 123a of the first partition wall 123 can be prevented from arriving at the heater core 18 by the aid of a wind flowing in the first airflow passage 125.

In addition, according to the present embodiment, the first partition wall 123 receives the condensed water Wcd dropped from the evaporator 16, and the first partition wall 123 divides the inside of the air conditioning case 12 vertically so as to define the first airflow passage 125 and the second airflow passage 126. Therefore, the vehicle air conditioning unit 10 that can implement the inside/outside air two-layer mode while additional components required to realize the inside/outside air two-layer mode are reduced can be provided.

Further, according to the present embodiment, the upstream end 123c of the upper wall surface 123a in the first partition wall 123 is located at a position lower than the portion 123d located uppermost in the up-down component 123b, and is disposed at a position offset from the heater 18 in the horizontal direction of the vehicle. Therefore, even if the condensed water Wcd pools on the upper wall surface 123a, and overflows from the upper wall surface 123a, since the condensed water Wcd flows to the bottom surface 127 of the air conditioning case 12 with the avoidance of the heater core 18 as indicated by a broken line Lex, the condensed water Wcd can be prevented from being applied to the heater core 18.

Second Embodiment

Next, a second embodiment of the present disclosure will be described. In the present embodiment, features which are different from those in the above-described first embodiment will be mainly described. Elements which are the same as or equivalent to those in the above-described embodiment will be omitted or simplified in the description. The omission or the simplification is similarly applied to embodiments subsequent to a third embodiment to be described later.

Figure 2:
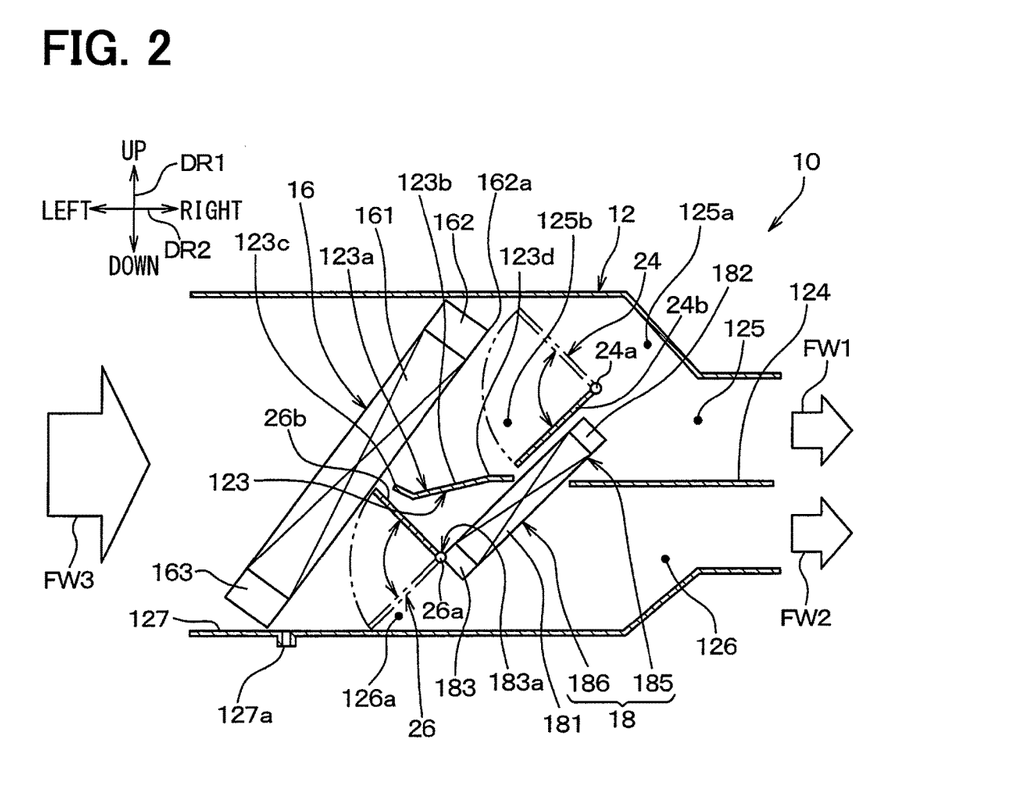
FIG. 2 is a cross-sectional view illustrating a main configuration of a vehicle air conditioning unit, which corresponds to FIG. 1, according to a second embodiment.

FIG. 2 is a cross-sectional view illustrating a main configuration of a vehicle air conditioning unit 10 according to the present embodiment, which corresponds to FIG. 1. The vehicle air conditioning unit 10 according to the present embodiment is different from that in the first embodiment described above in that each of air mixing doors 24 and 26 has a rotation type door mechanism.

As illustrated in FIG. 2, the first air mixing door 24 has the rotation type door mechanism, and opens or closes the upstream side of a heater core 18 in the air flow of a first airflow passage 125. The first air mixing door 24 includes a door shaft 24a and a door plate portion 24b, and the door plate portion 24b rotates about the door shaft 24a. The first air mixing door 24 is rotated by an electric actuator, not illustrated.

The first air mixing door 24 adjusts a flow proportion of the volume of air passing through a first heating portion 185 and the volume of air passing through a first bypass passage 125a according to a rotation angle of the first air mixing door 24. Specifically, the first air mixing door 24 is rotated from a max cool position where an air flow to the first heating portion 185 is blocked, and the total amount of air flows into the first bypass passage 125a to a max hot position where an air flow to the first bypass passage 125a is blocked, and the total amount of air flows into the first heating portion 185. In FIG. 2, the first air mixing door 24 at the max cool position is indicated by a solid line while the first air mixing door 24 at the max hot position is indicated by a two-dot chain line.

As with the first air mixing door 24, the second air mixing door 26 has the rotation type door mechanism, and opens or closes the upstream side of the heater core 18 in the air flow of a second airflow passage 126. The second air mixing door 26 includes a door shaft 26a and a door plate portion 26b, and the door plate portion 26b rotates about the door shaft 26a. The second air mixing door 26 is rotated by an electric actuator, not illustrated.

The second air mixing door 26 adjusts a flow proportion of the volume of air passing through the second heating portion 186 and the volume of air passing through a second bypass passage 126a according to a rotation angle of the second air mixing door 26. Specifically, the second air mixing door 26 is rotated from a max cool position where an air flow to the second heating portion 186 is blocked, and the total amount of air flows into the second bypass passage 126a to a max hot position where an air flow to the second bypass passage 126a is blocked, and the total amount of air flows into the second heating portion 186. In FIG. 2, the second air mixing door 26 at the max cool position is indicated by a solid line while the second air mixing door 26 at the max hot position is indicated by a two-dot chain line.

According to the present embodiment, since the first partition wall 123 is provided, and the evaporator 16 and the heater core 18 are disposed to be inclined as in the first embodiment, the advantages by those configurations can be obtained as in the first embodiment.

Third Embodiment

Next, a third embodiment of the present disclosure will be described. In the present embodiment, features which are different from those in the above-described second embodiment will be mainly described.

Figure 3:
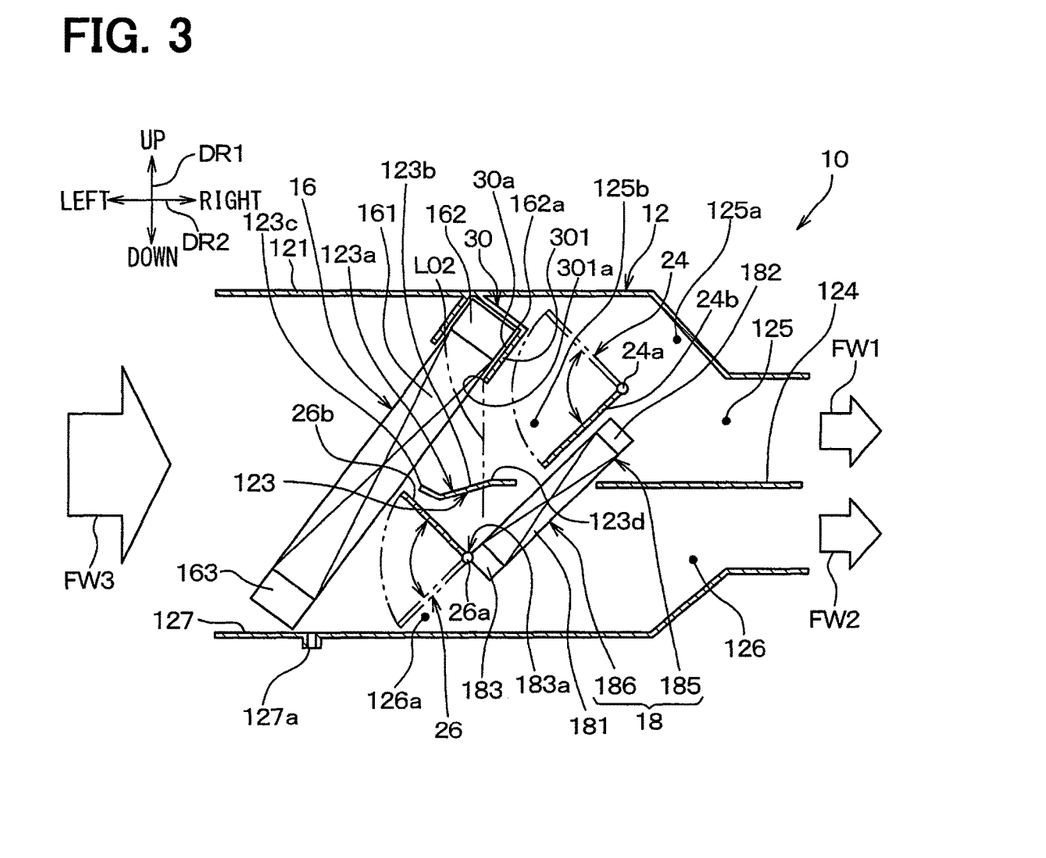
FIG. 3 is a cross-sectional view illustrating a main configuration of a vehicle air conditioning unit, which corresponds to FIG. 2, according to a third embodiment.

FIG. 3 is a cross-sectional view illustrating a main configuration of a vehicle air conditioning unit 10 according to the present embodiment, which corresponds to FIG. 2. The vehicle air conditioning unit 10 according to the present embodiment is different from the second embodiment described above in that a case rib 30 is provided, and a size of a first partition wall 123 is smaller than that of the second embodiment.

As illustrated in FIG. 3, an air conditioning case 12 includes the case rib 30 as an evaporator support portion for supporting an evaporator 16 on an upper side of the evaporator 16. The case rib 30 is formed integrally to project inward from an outer peripheral wall 121 of the air conditioning case 12. The case rib 30 is provided with a fitting groove 30a extending in a vehicle longitudinal direction, and a first header tank unit 162 as an upper end of the evaporator 16 is fitted into the fitting groove 30a. With the above configuration, an inclined posture of the evaporator 16 is maintained. The case rib 30 is disposed above the first partition wall 123. In FIG. 3, for clarification of the illustration, a gap is provided between the fitting groove 30a and the first header tank unit 162. However, the evaporator 16 is fitted into the fitting groove 30a so as not to swing against the fitting groove 30a.

As described above, since the evaporator 16 is fitted into the fitting groove 30a of the case rib 30, the case rib 30 includes a lower support portion 301 that is located below a fitting portion of the evaporator 16 fitted into the fitting groove 30*a*. For that reason, the lower support portion 301 receives a condensed water Wcd generated by the fitting portion. The lower support portion 301 is shaped into a plate extending in the vehicle longitudinal direction.

In the first partition wall 123 according to the present embodiment, a wall length in air flow directions FW1 and FW2 is shorter than that of the first partition wall 123 according to the second embodiment. Specifically, in the air flow directions FW1 and FW2, a downstream end (portion 123*d*) of an up-down component 123*b* included in an upper wall surface 123*a* of the first partition wall 123 is located upstream of a most downstream end 162*a* of the evaporator 16. However, the downstream end (portion 123*d*) of the up-down component 123*b* is located downstream of an upstream end 301*a* of the lower support portion 301. In other words, in FIG. 3, the downstream end (portion 123*d*) of the up-down component 123*b* is located on the right side of a virtual vertical line L02 that passes through the upstream end 301*a* of the lower support portion 301.

In the present embodiment, the lower support portion 301 and the first partition wall 123 receive the condensed water Wcd generated by the evaporator 16 as a whole. Therefore, the lower support portion 301 and the first partition wall 123 configure a first case wall that receives the condensed water Wcd. The evaporator 16 and the heater core 18 are disposed to be inclined as in the same manner as that in the first embodiment. Therefore, the advantages by those configurations can be obtained as in the first embodiment.

As understood from the present embodiment, when a component except for the first partition wall 123 which receives the condensed water Wcd such as the lower support portion 301 of the case rib 30 is provided, the first partition wall 123 does not need to cover an upper side of the heater core 18 over an overall area from the most upstream end 183*a* of the heater core 18 to the most downstream end 162*a* of the evaporator 16 in the air flow directions FW1 and FW2.

Fourth Embodiment

Next, a fourth embodiment of the present disclosure will be described. In the present embodiment, features which are different from those in the above-described second embodiment will be mainly described.

Figure 4:
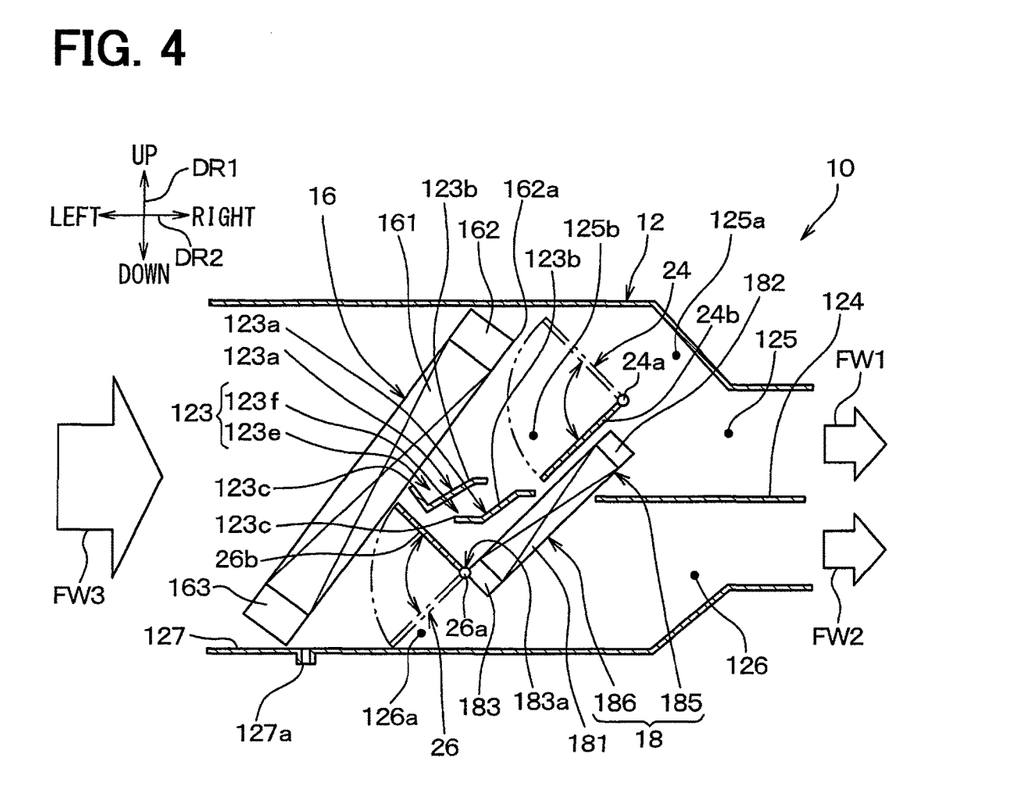
FIG. 4 is a cross-sectional view illustrating a main configuration of a vehicle air conditioning unit, which corresponds to FIG. 2, according to a fourth embodiment.

FIG. 4 is a cross-sectional view illustrating a main configuration of a vehicle air conditioning unit 10 according to the present embodiment, which corresponds to FIG. 2. The vehicle air conditioning unit 10 according to the present embodiment is different from the second embodiment described above in that a first partition wall 123 is divided into multiple components.

As illustrated in FIG. 4, the first partition wall 123 according to the present embodiment is divided into two components, and includes an upstream first partition wall 123*e* disposed on an upstream side in air flow directions FW1 and FW2, and a downstream first partition wall 123*f* disposed on a downstream side. Each of the upstream first partition wall 123*e* and the downstream first partition wall 123*f* includes an up-down component 123*b* on an upper wall surface 123*a*.

The upstream first partition wall 123*e* and the downstream first partition wall 123*f* are disposed such that a part of the upstream first partition wall 123*e* overlaps upward with a part of the downstream first partition wall 123*f*. Specifically, a portion of a downstream side of the upstream first partition wall 123*e* in the air flow directions FW1 and FW2 overlaps upward with a portion of an upstream side of the downstream first partition wall 123*f*.

According to the present embodiment, the upstream first partition wall 123*e* and the downstream first partition wall 123*f* receive the condensed water Wcd generated by the evaporator 16 as a whole. The evaporator 16 and the heater core 18 are disposed to be inclined as in the same manner as that in the first embodiment. Therefore, the advantages by those configurations can be obtained as in the first embodiment.

Other Embodiments (1) In the respective embodiments described above, the overlapped portion 18*a* of the heater core 18 disposed to overlap with the evaporator 16 from below in the vehicle vertical direction DR1 is configured by a part of the heater core 18, but may be configured by the entire heater core 18.

(2) In the respective embodiments described above, the vehicle air conditioning unit 10 is configured by, for example, a suction type layout. Alternatively, the vehicle air conditioning unit 10 may be configured by a push type layout in which the blower is disposed in the air flow upstream side with respect to the evaporator 16.

(3) In the first embodiment described above, each of the air mixing doors 24 and 26 is configured by a slide door. Alternatively, each of the air mixing doors 24 and 26 may be configured by a film door or a multi-plate butterfly door. In the second to fourth embodiments, the same is applied to the respective air mixing doors 24 and 26 configured by plate doors. A door mechanism of a type in which the air mixing doors 24 and 26 are different from each other may be employed.

(4) In the respective embodiments described above, the first partition wall 123 receives the condensed water Wcd on the upper wall surface 123*a*. The first partition wall 123 may be provided with a fine hole if the condensed water Wcd can be prevented from being applied to the heater core 18.

(5) In the respective embodiments described above, the heater core 18 is a heater that heats the air flowing in the air conditioning case 12 with the use of a waste heat of an engine. Alternatively, there is no need to use the waste heat of the engine, and, for example, an electric heater may be used as the heater instead of the heater core 18.

(6) In the respective embodiments described above, the first airflow passage 125 and the second airflow passage 126 in the air conditioning case 12 are extended in the vehicle width direction DR2. Alternatively, the first airflow passage 125 and the second airflow passage 126 may be extended in the vehicle longitudinal direction.

(7) In the respective embodiments described above, the two airflow passages 125 and 126 are juxtaposed with each other downstream of the evaporator 16 in the air flow directions FW1 and FW2. Alternatively, only one airflow passage may be provided without provision of the second partition wall 124.

When only one airflow passage is provided as described above, the heater core 18 does not need to be sandwiched between the two bypass passages 125*a* and 126*a* in the vehicle vertical direction DR1. For example, the second bypass passage 126*a* may not be provided, and only the first bypass passage 125*a* may be provided. Alternatively, the two air mixing doors 24 and 26 may be replaced with one air mixing door.

(8) In the respective embodiments described above, both of the evaporator 16 and the heater core 18 are disposed to be inclined. Alternatively, the evaporator 16 may be inclined whereas the heater core 18 may stand upright along the vehicle vertical direction DR1 and be disposed below the evaporator 16.

The present disclosure is not limited to the above described embodiments, and may be appropriately changed with respect to the scope described in the claims. Further, needless to say, in each of the above described embodiments, the elements constituting each embodiment are not necessarily essential, except for elements which are specifically shows as being essential or are clearly essential on a fundamental level. Further, in each of the above described embodiments, in case a numerical value is described for a counting number, a value, an amount, a range or the like for a component element of an embodiment, these specific values are not limiting, except in the case in which a specific number liming is clearly described as being essential or is clearly essential on a fundamental level. Further, in each of the above described embodiments, if the material properties, shapes, positional relationships or the like of component elements of an embodiment are described, these material properties, shapes, positional relationships or the like are not limiting, except in the case in which a specific material property, shape, positional relationship or the like is clearly described as being essential or is clearly essential on a fundamental level.

What is claimed is:

1. A vehicle air conditioning unit comprising:
   an air conditioning case that circulates an air into a vehicle interior;
   a cooler disposed in the air conditioning case, the cooler cooling the air flowing in the air conditioning case; and
   a heater disposed in the air conditioning case, the heater heating the air flowing out of the cooler, wherein
   the heater includes an overlapped portion disposed to overlap with the cooler from below in a vertical direction of the vehicle, the overlapped portion being at least a portion of the heater,
   the air conditioning case includes a first case wall that receives a condensed water generated by the cooler, the first case wall being disposed above the overlapped portion of the heater and being disposed between the heater and the cooler,
   the air flows in the air conditioning case in an air flow direction orthogonal to the vertical direction,
   the cooler includes an upper end and a lower end, the upper end being disposed in an inclined manner with respect to the vertical direction such that the upper end is offset downstream in the air flow direction within the air conditioning case as compared to the lower end,
   the heater is disposed so as to be inclined in a same direction as the cooler,
   the first case wall is disposed such that a portion or all of the first case wall is interposed, in a horizontal direction of the vehicle, between a most downstream end located on a most downstream side of the upper end of the cooler in the air flow direction and a most upstream end located on a most upstream side of a lower end of the heater in the air flow direction,
   the air conditioning case further includes a second case wall disposed downstream of the heater in the air flow direction, and
   the first case wall and the second case wall divide an inside of the air conditioning case vertically to define a first airflow passage and a second airflow passage, the air flowing in the air flow direction through the first airflow passage and the second airflow passage, the second airflow passage being disposed below the first airflow passage.

2. The vehicle air conditioning unit according to claim 1, wherein
   the first case wall includes an upper wall surface, the upper wall surface being on an upper side of the first case wall, and
   the upper wall surface includes an up-down component configured such that a downstream side thereof is positioned higher than an upstream side thereof in the air flow direction.

3. The vehicle air conditioning unit according to claim 2, wherein
   the upper wall surface includes an upstream end that is coupled with the upstream side of the up-down component in the air flow direction, and
   the upstream end of the upper wall surface is disposed at a position lower than a portion located uppermost in the up-down component, and is disposed at a position offset from the heater in the horizontal direction.

4. The vehicle air conditioning unit according to claim 3, wherein
   the portion located uppermost in the up-down component is located downstream of the most downstream end of the cooler in the air flow direction.

5. The vehicle air conditioning unit according to claim 1, wherein
   the heater is positioned to extend across the first airflow passage and the second airflow passage, the heater including a first heating portion disposed in the first airflow passage and a second heating portion disposed in the second airflow passage,
   the first airflow passage includes a first bypass passage that allows the air flowing through the cooler to bypass the first heating portion, the first bypass passage being disposed above the first heating portion, and
   the second airflow passage includes a second bypass passage that allows the air flowing through the cooler to bypass the second heating portion, the second bypass passage being disposed below the second heating portion.

6. The vehicle air conditioning unit according to claim 1, further comprising:
   a door provided in the second airflow passage separately from the first case wall and the second case wall, wherein
   the door is configured to receive the condensed water dropping from the first case wall.

7. The vehicle air conditioning unit according to claim 1, further comprising:
   a first door provided in the second airflow passage separately from and below the first case wall and the second case wall, the first door is configured to receive the condensed water dropping from the first case wall; and
   a second door provided in the first airflow passage separately from and above the first case wall and the second case wall.

8. A vehicle air conditioning unit comprising:
   an air conditioning case that circulates an air into a vehicle interior;
   a cooler disposed in the air conditioning case, the cooler cooling the air flowing in the air conditioning case; and
   a heater disposed in the air conditioning case, the heater heating the air flowing out of the cooler, wherein the heater includes an overlapped portion disposed to overlap with the cooler from below in a vertical direction of the vehicle, the overlapped portion being at least a portion of the heater, the air conditioning case includes a first case wall that receives a condensed water generated by the cooler, the first case wall being disposed above the overlapped portion of the heater and being disposed between the heater and the cooler, the air flows in the air conditioning case in an air flow direction orthogonal to the vertical direction, the cooler and the heater are disposed so as to be inclined with respect to the air flow direction within the air conditioning case, the first case wall is disposed such that a portion or all of the first case wall is interposed, in the horizontal direction of the vehicle, between a most downstream end of the cooler in the air flow direction and a most upstream end of the heater in the air flow direction, and the first case wall divides an inside of the air conditioning case vertically to define a first airflow passage and a second airflow passage, the air flowing in the air flow direction through the first airflow passage and the second airflow passage, the second airflow passage being disposed below the first airflow passage.

9. The vehicle air conditioning unit according to claim 8, further comprising:

a door provided in the second airflow passage separately from the first case wall, wherein the door is configured to receive the condensed water dropping from the first case wall.

10. The vehicle air conditioning unit according to claim 8, further comprising:

a first door provided in the second airflow passage separately from and below the first case wall, the first door is configured to receive the condensed water dropping from the first case wall; and a second door provided in the first airflow passage separately from and above the first case wall.

11. A vehicle air conditioning unit comprising:

an air conditioning case that circulates an air into a vehicle interior;

a cooler disposed in the air conditioning case, the cooler cooling the air flowing in the air conditioning case; and a heater disposed in the air conditioning case, the heater heating the air flowing out of the cooler, wherein the heater includes an overlapped portion disposed to overlap with the cooler from below in a vertical direction of the vehicle, the overlapped portion being at least a portion of the heater, the air conditioning case includes a first case wall that receives a condensed water generated by the cooler, the first case wall being disposed above the overlapped portion of the heater and being disposed between the heater and the cooler, the first case wall divides an inside of the air conditioning case vertically to define a first airflow passage and a second airflow passage, the air flowing in the air flow direction through the first airflow passage and the second airflow passage, the second airflow passage being disposed below the first airflow passage, a door provided in the second airflow passage separately from the first case wall, wherein the door is configured to receive the condensed water dropping from the first case wall.

12. The vehicle air conditioning unit according to claim 11, wherein the door provided in the second airflow passage is below the first case wall, and a second door is provided in the first airflow passage separately from and above the first case wall.

* * * * *